United States Patent
Shin et al.

(10) Patent No.: US 10,026,214 B2
(45) Date of Patent: Jul. 17, 2018

(54) RAY TRACING APPARATUS AND METHOD

(71) Applicant: Samsung Electronics Co., Ltd., Suwon-si (KR)

(72) Inventors: Youngsam Shin, Hwaseong-si (KR); Wonjong Lee, Seoul (KR); Seokjoong Hwang, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/335,723

(22) Filed: Oct. 27, 2016

(65) Prior Publication Data

US 2017/0116775 A1    Apr. 27, 2017

(30) Foreign Application Priority Data

Oct. 27, 2015    (KR) .................. 10-2015-0149724

(51) Int. Cl.

| G06T 15/06 | (2011.01) |
| G06T 15/80 | (2011.01) |
| G06T 7/00 | (2017.01) |
| G06T 15/20 | (2011.01) |
| G06T 17/10 | (2006.01) |
| G06T 1/20 | (2006.01) |
| G06T 7/40 | (2017.01) |

(52) U.S. Cl.
CPC .............. *G06T 15/06* (2013.01); *G06T 1/20* (2013.01); *G06T 7/0081* (2013.01); *G06T 7/0085* (2013.01); *G06T 7/408* (2013.01); *G06T 15/20* (2013.01); *G06T 15/80* (2013.01); *G06T 17/10* (2013.01); *G06T 2200/04* (2013.01); *G06T 2200/28* (2013.01); *G06T 2207/20112* (2013.01)

(58) Field of Classification Search
None
See application file for complete search history.

(56) References Cited

U.S. PATENT DOCUMENTS

| 8,411,088 B2 | 4/2013 | Sevastianov et al. |
| 8,922,550 B2 | 12/2014 | Stich |

(Continued)

FOREIGN PATENT DOCUMENTS

| KR | 10-1284324 B1 | 7/2013 |
| KR | 10-2013-0124125 A | 11/2013 |
| KR | 10-2015-0057868 A | 5/2015 |

*Primary Examiner* — Said Broome
(74) *Attorney, Agent, or Firm* — F. Chau & Associates, LLC

(57) ABSTRACT

A ray tracing apparatus includes a traversal (TRV) core configured to traverse an acceleration structure (AS) to detect a first node and a second node, which intersect with a generated ray and have a determined same parent node, and to determine whether the ray intersects with an overlap region where a first bounding box corresponding to the first node overlaps a second bounding box corresponding to the second node; and, an intersection test (IST) determiner configured to calculate a first hit point where the ray intersects with a primitive belonging to the first node, which is a closer node to a view point of the ray among the first node and the second node, and to determine a final hit point of the ray based on a result of the determining of whether the ray intersects with respect to an overlap region, by the TRV core.

18 Claims, 10 Drawing Sheets

(56) References Cited

U.S. PATENT DOCUMENTS

| | | | |
|---|---|---|---|
| 2004/0125103 A1* | 7/2004 | Kaufman | G06T 15/06 345/419 |
| 2007/0257911 A1* | 11/2007 | Bavoil | G06T 15/60 345/426 |
| 2008/0088622 A1* | 4/2008 | Shearer | G06T 15/06 345/421 |
| 2008/0100617 A1* | 5/2008 | Keller | G06T 15/06 345/421 |
| 2013/0342528 A1 | 12/2013 | Lee et al. | |
| 2014/0375641 A1* | 12/2014 | Bakalash | G06T 15/80 345/426 |
| 2015/0138202 A1 | 5/2015 | Lee et al. | |

* cited by examiner

RAY TRACING APPARATUS AND METHOD

CROSS-REFERENCE TO RELATED APPLICATION

This application claims the benefit under 35 USC § 119(a) of Korean Patent Application No. 10-2015-0149724, filed on Oct. 27, 2015, in the Korean Intellectual Property Office, the entire disclosure of which is incorporated herein by reference for all purposes.

BACKGROUND

1. Field

The present disclosure relates to a ray tracing apparatus and method.

2. Description of Related Art

Three-dimensional (3D) rendering refers to image processing for synthesizing 3D object data into an image viewed from a given view point of a camera.

Examples of rendering approaches include a rasterization approach and a ray tracing approach. The rasterization approach generates an image while projecting 3D objects onto a screen. The ray tracing approach generates an image by tracing a path of incident light along which a ray is emitted from a view point of a camera to each pixel of the image.

When the ray tracing approach is used, a high-quality image may be generated by reflecting physical properties of light (reflection, refraction, transmission, etc.) in a rendering result, but an amount of computation is relatively large, thus making it difficult to perform rendering at a high speed.

In the ray tracing approach, generating an acceleration structure (hereinafter, referred to as "AS") by spatially splitting or dividing a scene object to be rendered, traversing the AS (hereinafter, referred to as "TRV"), and conducting an intersection test (hereinafter, referred to as "IST") between a ray and one or more primitive portions for each object typically requires a large amount of computation resources (such as processing time, bandwidth, memory, and the like).

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a general aspect, a ray tracing apparatus includes a traversal (TRV) core configured to traverse an acceleration structure (AS) to detect a first node and a second node, which intersect with a generated ray and have a determined same parent node, and to determine whether the ray intersects with an overlap region where a first bounding box corresponding to the first node overlaps a second bounding box corresponding to the second node; and, an intersection test (IST) determiner configured to calculate a first hit point where the ray intersects with a primitive belonging to the first node, which is a closer node to a view point of the ray among the first node and the second node, and to determine a final hit point of the ray based on a result of the determining of whether the ray intersects with respect to an overlap region, by the TRV core.

A point where the ray intersects with the first bounding box may be nearer to a view point of the ray than a point where the ray intersects with the second bounding box.

The IST determiner may be further configured to determine the calculated first hit point to be the final hit point of the ray and responsively omit further traversal with respect to the second node in response to the determining of whether the ray intersects with an overlap region.

The TRV core may be further configured to calculate a second hit point where the ray intersects with the overlap region in response to the ray being determined to intersect with the overlap region, and the IST determiner may be further configured to determine the first hit point as the final hit point when the second hit point is determined to be farther from a view point of the ray than the first hit point.

The IST determiner may be further configured to check for a third hit point between a primitive belonging to the second node and the ray when the second hit point is nearer to the view point of the ray than the first hit point.

The IST determiner may be further configured to determine whichever one of the first hit point and the third hit point is nearer to the view point of the ray to be the final hit point.

The first node and the second node may be leaf nodes of the acceleration structure.

The TRV core may be further configured to check whether the ray intersects with the overlap region based on acquired coordinate values representing the overlap region, and the coordinate values representing the overlap region may be acquired based on determined coordinate values representing the first bounding box and determined coordinate values representing the second bounding box.

The ray tracing apparatus may further include a shader configured to determine a color value of a pixel based on the determined final hit point.

The ray tracing apparatus may further include a ray generator configured to generate the ray.

According to another general aspect, a ray tracing method includes actuating a traversal (TRV) core to traverse an acceleration structure (AS) to detect a first node and a second node that intersect with a ray and have a same parent node; calculating a first hit point where the ray intersects with a primitive belonging to the first node, which is a nearer node to a view point of the ray among the first node and the second node; determining whether the ray intersects with an overlap region where a first bounding box corresponding to the first node overlaps a second bounding box corresponding to the second node; and determining a final hit point of the ray based on a result of the determining of whether the ray intersects with the overlap region.

A point where the ray intersects with the first bounding box may be nearer to the view point of the ray than a point where the ray intersects with the second bounding box.

The determining of the final hit point of the ray may include, determining the calculated first hit point as the final hit point of the ray, and responsively omit traversal along the second node when the ray is determined to not intersect with the overlap region.

The determining of the final hit point of the ray may include calculating a second hit point where the ray intersects with the overlap region when the ray is determined to intersect with the overlap region; and determining the first hit point as the final hit point when the second hit point is determined to be further from the view point of the ray than the first hit point.

The determining of the final hit point of the ray may further include identifying a hit point between the ray and a primitive belonging to the second node when the second hit point is determined to be nearer to the view point of the ray than the first hit point.

The determining of the final hit point of the ray may further include determining whichever one of the first hit point and a third hit point is nearer to the view point of the ray to be the final hit point, the third hit point being a point where the ray intersects with the primitive belonging to the second node.

The first node and the second node may be leaf nodes.

The checking of whether the ray intersects with the overlap region may include acquiring coordinate values representing the overlap region based on coordinate values representing the first bounding box and coordinate values representing the second bounding box; and, determining whether the ray intersects with the overlap region, based on the coordinate values representing the overlap region.

The ray tracing method further including determining a color value of a pixel based on the determined final hit point.

A non-transitory computer-readable recording medium may have recorded thereon a program for performing the method on a computer.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to the scale, and the relative size, proportions, and depiction of elements in the drawings may be exaggerated for clarity, illustration, and convenience.

DETAILED DESCRIPTION

Figure 1:
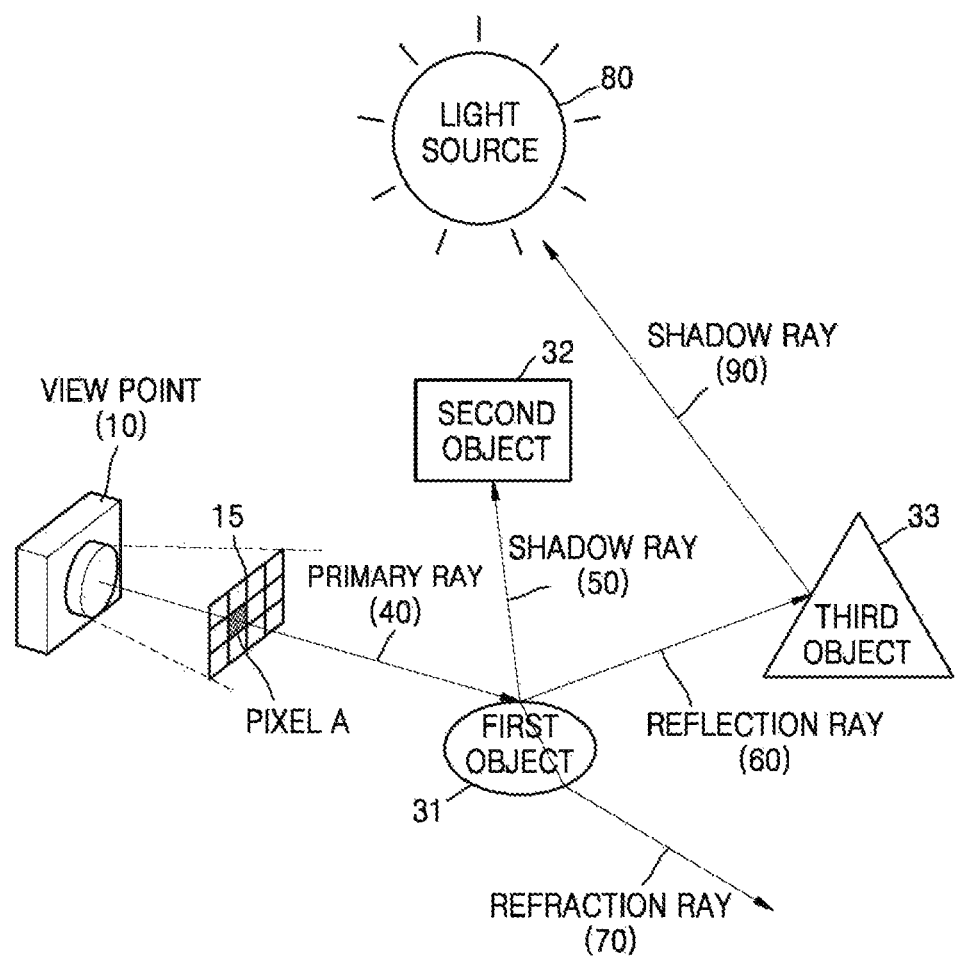
FIG. 1 is a diagram describing a general ray tracing method according to one or more embodiments.

The following detailed description is provided to assist the reader in gaining a comprehensive understanding of the method and/or apparatus described herein. However, after an understanding of the present disclosure, various changes, modifications, and equivalents of the method and/or apparatus described herein may then be apparent to one of ordinary skill in the art. The sequences of operations described herein are merely non-limiting examples, and are not limited to those set forth herein, but may be changed as will be apparent to one of ordinary skill in the art, with the exception of operations necessarily occurring in a certain order, after an understanding of the present disclosure. Also, descriptions of functions and constructions that may be understood, after an understanding of differing aspects of the present disclosure, may be omitted in some descriptions for increased clarity and conciseness.

Various alterations and modifications may be made to embodiments, some of which will be illustrated in detail in the drawings and detailed description. However, it should be understood that these embodiments are not construed as limited to the disclosure and illustrated forms and should be understood to include all changes, equivalents, and alternatives within the idea and the technical scope of this disclosure.

Terms used herein are to merely explain specific embodiments, thus they are not meant to be limiting. A singular expression includes a plural expression except when two expressions are contextually different from each other. For example, as used herein, the singular forms "a", "an", and "the" are intended to include the plural forms as well, unless the context clearly indicates otherwise. Herein, a term "include" or "have" are also intended to indicate that characteristics, figures, operations, components, or elements disclosed on the specification or combinations thereof exist. The term "include" or "have" should be understood so as not to pre-exclude existence of one or more other characteristics, figures, operations, components, elements or combinations thereof or additional possibility. In addition, though terms such as first, second, A, B, (a), (b), and the like may be used herein to describe components, unless indicated otherwise, these terminologies are not used to define an essence, order, or sequence of a corresponding component but used merely to distinguish the corresponding component from other component(s). Furthermore, any recitation of ranges of values herein are merely intended to serve as a shorthand method of referring individually to each separate value falling within the range, unless otherwise indicated herein, and each separate value is incorporated into the specification as if it were individually recited herein.

The features described herein may be embodied in different forms, and are not to be construed as being limited to the examples described herein. Rather, the examples described herein have been provided so that this disclosure will be thorough and complete, and will convey a scope of the disclosure to one of ordinary skill in the art.

Reference will now be made in detail to embodiments, examples of which are illustrated in the accompanying drawings, wherein like reference numerals refer to like elements throughout.

The terms used in the present disclosure are those general terms currently widely used in the art, but the terms may vary according to the intention of those of ordinary skill in the art, precedents, or new technology in the art. Also, specified terms may be selected by the applicant, and in this case, the detailed meaning thereof will be described in the detailed description. Thus, the terms used in the present disclosure should be understood not as simple names but based on the meaning of the terms and the overall description.

It will also be understood that the terms "comprises", "includes", and "has", when used herein, specify the presence of stated elements, but do not preclude the presence or addition of other elements, unless otherwise defined.

FIG. 1 is a diagram describing a general ray tracing method in accordance with one or more embodiments.

As illustrated in FIG. 1, a 3D modeling may include a light source 80, a first object 31, a second object 32, and a third object 33. For convenience of explanation, the first object 31, the second object 32, and the third object 33 are illustrated as two-dimensional (2D) objects in FIG. 1, but the first object 31, the second object 32, and the third object 33 will generally be 3D objects.

It may be assumed that a reflectivity and a refractivity of the first object 31 are greater than 0, and a reflectivity and a refractivity of each of the second object 32 and the third object 33 are 0. That is, it may be assumed that the first object 31 reflects and refracts light, and the second object 32 and the third object 33 neither reflect nor refract light.

In the 3D modeling of FIG. 1, a rendering apparatus (for example, a ray tracing apparatus 100 of FIG. 2) may determine a view point 10 and a screen 15 according to the determined view point 10 to generate a 3D image. When the view point 10 and the screen 15 are determined, the ray tracing apparatus 100 may generate rays for pixels of the screen 15 from the view point 10. For example, as illustrated in FIG. 1, when the screen 15 has a resolution of 4×3, rays may be generated for twelve pixels.

For convenience of explanation, only a ray for one pixel (e.g., pixel A) will be described below.

Referring to FIG. 1, a primary ray 40 for the pixel A may be generated from the view point 10. The primary ray 40 may pass through a 3D space and then arrive at the first object 31. The first object 31 may include a set of uniform unit regions (hereinafter, referred to as primitives). For example, the primitive may be a polygon, such as a triangle or a rectangle. Hereinafter, for convenience of explanation, it is assumed that the primitive is a triangle.

A shadow ray 50, a reflection ray 60, and a refraction ray 70 may be generated at a hit point between the primary ray 40 and the first object 31. The shadow ray 50, the reflection ray 60, and the refraction ray 70 may be also referred to as secondary rays.

The shadow ray 50 is generated from the hit point in a direction of the light source 80. The reflection ray 60 is generated in a direction corresponding to an incidence angle of the primary ray 40 and is assigned a weight according to the reflectivity of the first object 31. The refraction ray 70 is generated in a direction corresponding to the incidence angle of the primary ray 40 and the refractivity of the first object 31 and is assigned a weight according to the refractivity of the first object 31.

The ray tracing apparatus 100 may determine whether the hit point is exposed to the light source 80, based on the shadow ray 50. For example, as illustrated in FIG. 1, when the shadow ray 50 meets the second object 32, a shadow may be generated at a hit point caused by the shadow ray 50. In addition, the ray tracing apparatus 100 may determine whether the refraction ray 70 and the reflection ray 60 hit other objects. For example, as illustrated in FIG. 1, no object is present in a traveling direction of the refraction ray 70 and the reflection ray 60 arrives at the third object 33. Therefore, the ray tracing apparatus 100 may check coordinates and color information of a hit point of the third object 33 and generate a shadow ray 90 from the hit point of the third object 33. The ray tracing apparatus 100 may determine whether the shadow ray 90 is exposed to the light source 80.

When the reflectivity and the refractivity of the third object 33 are 0, a reflection ray and a refraction ray for the third object 33 are not generated.

As described above, the ray tracing apparatus 100 may analyze the primary ray 40 for the pixel A and all rays derived from the primary ray 40 and determine a color value of the pixel A based on a result of the analysis. The determination of the color value of the pixel A may be affected by a color of the hit point of the primary ray 40, a color of the hit point of the reflection ray 60, and whether the shadow ray 50 arrives at the light source 80.

The ray tracing apparatus 100 may configure the screen 15 by performing the above-described processes on each of the pixels of the screen 15.

Figure 2:
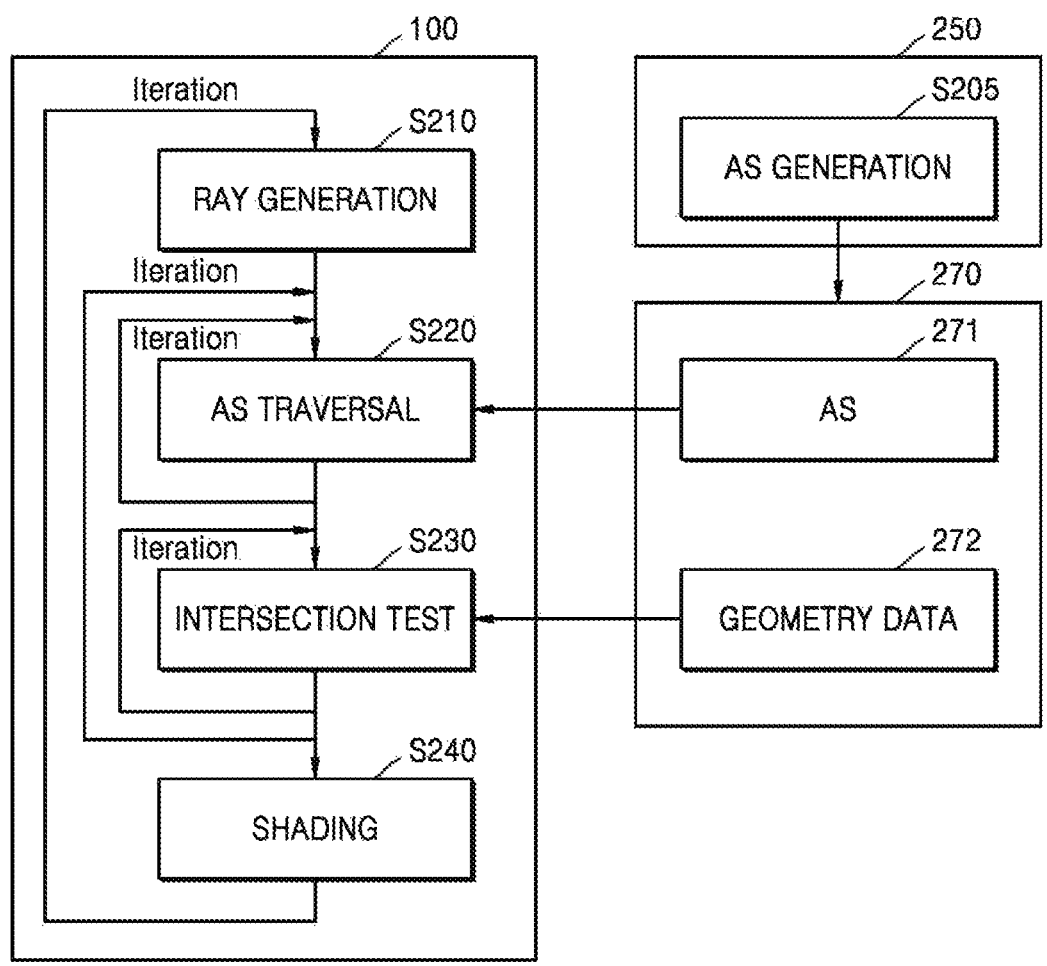
FIG. 2 is a diagram describing a ray tracing method according to one or more embodiments.

FIG. 2 is a diagram describing a ray tracing method according to one or more embodiments.

Referring to FIG. 2, for example, a ray tracing system includes a ray tracing apparatus 100, an AS generator 250, and an external memory 270.

In operation S210, the ray tracing apparatus 100 may generate rays. The rays may include a primary ray generated from a view point and rays derived from the primary ray. For example, as described above with reference to FIG. 1, the ray tracing apparatus 100 may generate the primary ray from the view point 10 and generate the secondary ray at the hit point between the primary ray and the object. In this case, the secondary ray may be a reflection ray, a refraction ray, or a shadow ray, which is generated at the hit point between the primary ray and the object.

In addition, the ray tracing apparatus 100 may generate a tertiary ray at a hit point between a secondary ray and an object. The ray tracing apparatus 100 may continuously generate rays until the rays do not intersect with the object or the rays have been generated a predetermined number of times.

In operation S220, the ray tracing apparatus 100 may read an acceleration structure such as AS 271 from the external memory 270 and traverse the AS 271 based on the generated ray.

In this case, the AS 271 may be generated by the AS generator 250, and the generated AS 271 may be stored in the external memory 270.

In operation S205, the AS generator 250 may generate the AS 271 including location information of objects in a 3D space. The AS generator 250 may split the 3D space into a hierarchical tree form. The AS generator 250 may generate ASs in various shapes. For example, the AS generator 250 may generate an AS representing a relationship between objects in a 3D space by applying K-dimensional tree (KD-tree) or bounding volume hierarchy (BVH).

Figure 3:
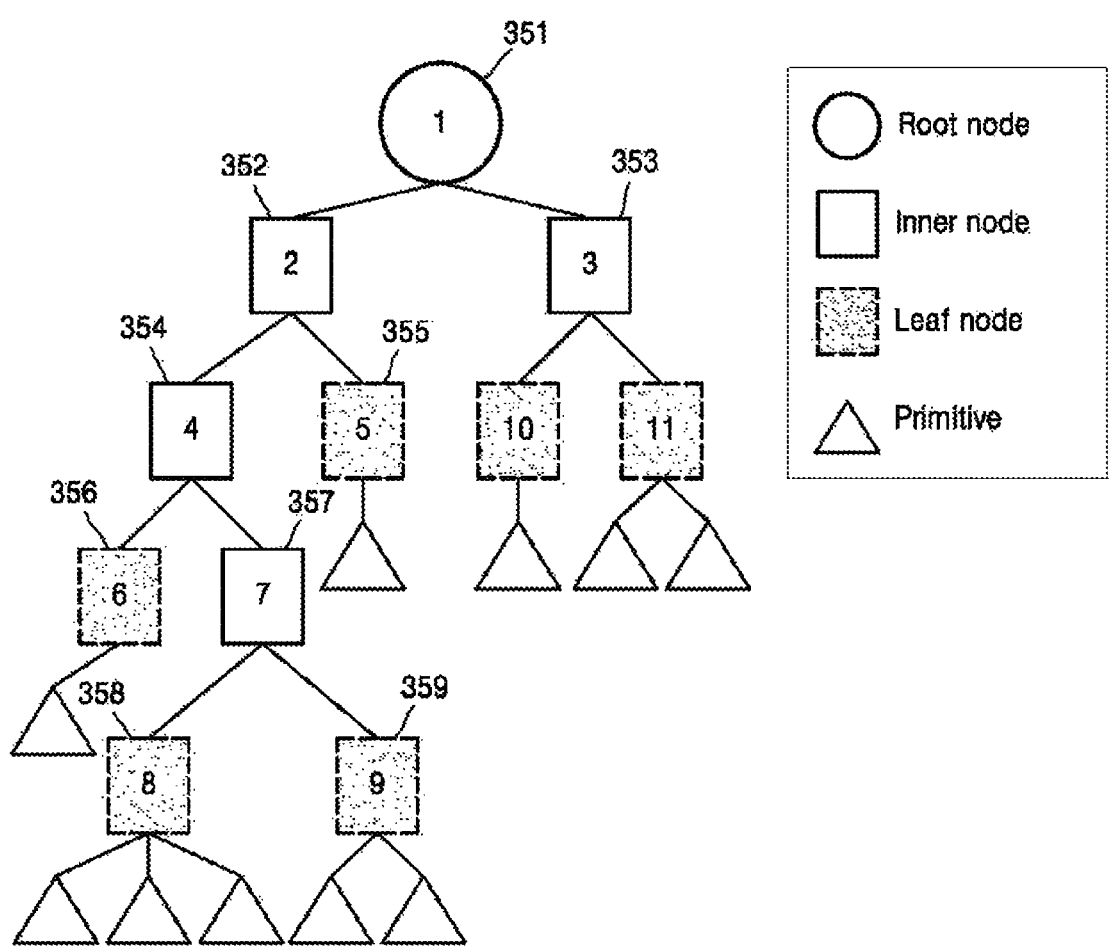
FIG. 3 is a diagram describing an acceleration structure (AS) according to one or more embodiments.
Figure 4:
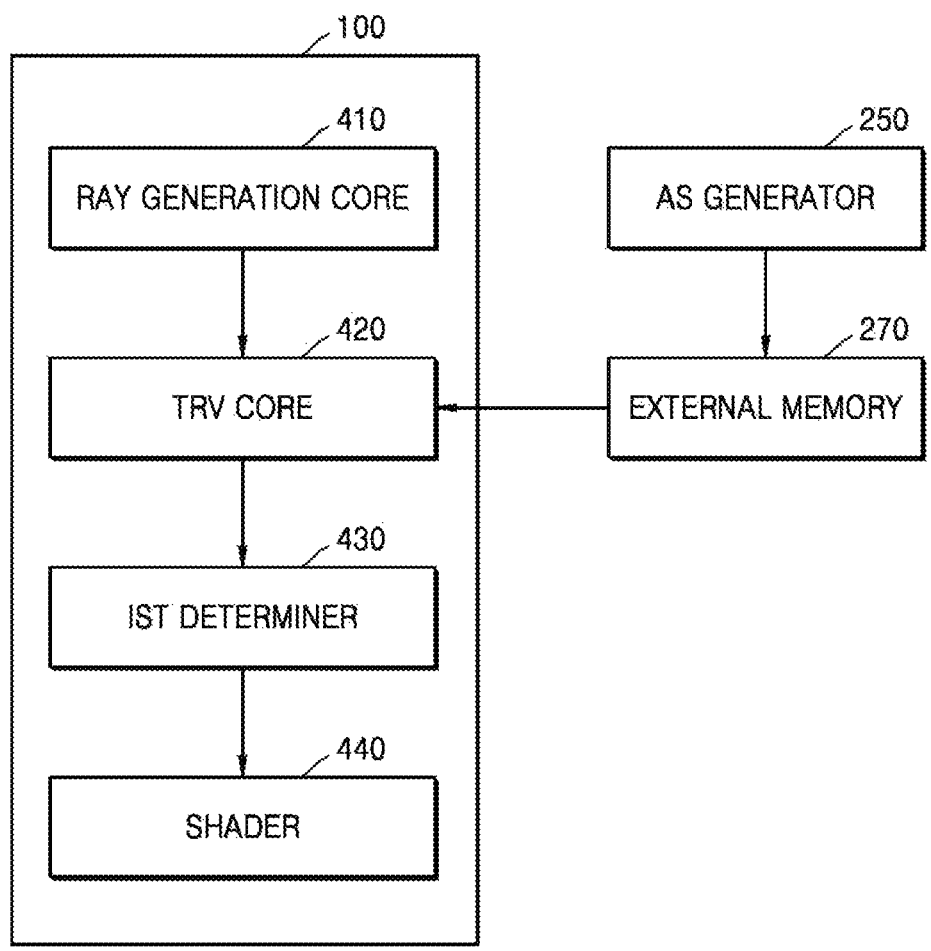
FIG. 4 is a block diagram of a ray tracing system according to one or more embodiments.

The apparatuses, units, modules, devices, and other components illustrated in any or all of FIGS. 2 and 4 that perform the operations described herein with respect to any of FIGS. 1-10 are hardware components. Examples of the hardware components include controllers, sensors, generators, drivers, and any other electronic components known to one of ordinary skill in the art after gaining a full understanding of the present disclosure. In one example, the hardware components are or include one or more processing devices, such as processors or computers, as only examples. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a specially defined manner to achieve a desired result. In one example, a processing device, such as the processor or computer may include, or be connected to, one or more memories storing instructions or software that are executed by the processor or computer. Hardware components implemented by a processor or computer execute instructions or software, such as an operating system (OS) and one or more software applications that run on the OS, to perform the operations described herein with respect to any of FIGS. 1-10. The hardware components also access, manipulate, process, create, and store data in response to execution of the instructions or software. For simplicity, the singular term "processing device", "processor", or "computer" may be used in the description of the examples described herein, but in other examples multiple processing devices, such as multiple processors or computers, are used, or a processor or computer includes multiple processing elements, or multiple types of processing elements, or both. In one example, a hardware component includes multiple processing devices or processors, and in another example, a hardware component includes a processing device or processor and a controller. A hardware component has any one or more of different processing configurations, examples of which include a single processing device or processor, independent processing devices or processors, parallel processing devices or processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described herein are performed by one or more processing devices, such as a processor or a computer, as only examples, and as described above executing instructions to perform the operations described herein.

FIG. 3 is a diagram describing an AS according to one or more embodiments.

Hereinafter, for convenience of explanation, each node in the AS may be referred to by using a number assigned to the node. For example, a node 351, which is assigned a number "1" and has a circular shape, may be referred to as a first node 351. A node 352, which is assigned a number "2" and has a rectangular shape, may be referred to as a second node 352. A node 355, which is assigned a number "5" and has a dashed rectangular shape, may be referred to as a fifth node 355.

Referring to FIG. 3, the AS may include a root node, inner nodes, leaf nodes, and primitives. In FIG. 3, the first node 351 is a root node. The root node is a highest node that has no parent node and has only child nodes. For example, child nodes of the first node 351 are the second node 352 and the third node 353, and the first node 351 has no parent node. In addition, the second node 352 may be an inner node. The inner node is a node that has both a parent node and child nodes. For example, the parent node of the second node 352 is the first node 351, and the child nodes of the second node 352 are a fourth node 354 and a fifth node 355. In addition, an eighth node 358 may be a leaf node. The leaf node is a lowest node that has no child node and has only a parent node. For example, the parent node of the eighth node 358 is a seventh node 357, and the eighth node 358 has no child node (primitives, shown as triangles, are not considered nodes).

A leaf node may include primitives belonging to the leaf node. For example, as illustrated in FIG. 3, a sixth node 356, which is a leaf node, includes one primitive, the eighth node 358, which is a leaf node, includes three primitives, and a ninth node 359, which is a leaf node, includes two primitives.

Referring back to FIG. 2, the ray tracing apparatus 100, according to one or more embodiments, may detect a leaf node intersecting with a ray by traversing information about the read AS. The ray tracing apparatus 100 may iteratively traverse the AS until the lead node intersecting with the ray is detected.

The ray tracing apparatus 100 may traverse the AS along any one path. When the ray does not intersect with a leaf node on the traversed path, the ray tracing apparatus 100 may traverse the AS along another path. For example, referring to FIG. 3, the ray tracing apparatus 100 may start to traverse from the second node 352 or the third node 353, which is a lower node of the first node 351. When the ray tracing apparatus 100 starts to traverse from the second node 352, the ray tracing apparatus 100 may store information about the third node 353 in a separate memory.

The ray tracing apparatus 100 may determine whether the ray intersects with the second node 352. When the ray intersects with the second node 352, the ray tracing apparatus 100 may traverse any one of the fourth node 354 and the fifth node 355, which are lower nodes of the second node 352.

When the ray tracing apparatus 100 traverses the acceleration structure (AS), to determine whether the ray intersects with the fourth node 354, the ray tracing apparatus 100 may store information about the fifth node 355 in the separate memory. When the ray intersects with the fourth node 354, the ray tracing apparatus 100 may then traverse any one of the sixth node 356 and the seventh node 357, which are lower nodes of the fourth node 354.

When the ray tracing apparatus 100 traverses the AS, to determine whether the ray intersects with the sixth node 356, the ray tracing apparatus 100 may store information about the seventh node 357 in the separate memory. When the ray tracing apparatus 100 traverses the AS, to determine whether the ray intersects with the sixth node 356, the ray tracing apparatus 100 may detect the sixth node 356 as a leaf node.

As described above, the ray tracing apparatus 100 may detect the leaf node by performing traversal of the AS along any one path. The information about the nodes of other paths may be stored in the separate memory, and the ray tracing apparatus 100 may perform traversal of the AS again from a most recently stored node when the traversal of one path is completed. For example, after the sixth node 356 is detected as the leaf node, the ray tracing apparatus 100 may perform traversal of the AS again from the seventh node 357 which is most recently stored.

Therefore, when the traversal of one path is completed, the ray tracing apparatus 100 does not perform path traversal again from the root node, but traverses a path which is most adjacent to the traversed path, thus reducing an amount of computation.

When the leaf node is detected, the ray tracing apparatus 100 may read information (geometry data 272) about primitives belonging to the detected leaf node from the external memory 270.

In operation S230, the ray tracing apparatus 100 may perform an intersection test between a ray and primitives based on the retrieved information about the primitives. For example, when three primitives (first to third primitives) belong to the detected leaf node, the ray tracing apparatus 100 may detect a primitive intersecting with a ray by an intersection test between the first primitive and the ray, an intersection test between the second primitive and the ray, and an intersection test between the third primitive and the ray.

Therefore, it is possible to detect primitives intersecting with a ray and to calculate a hit point at which the detected primitive intersects with the ray.

In operation S240, the ray tracing apparatus 100 may perform shading of pixels based on the intersection test. The ray tracing apparatus 100 may determine a color value of a pixel based on information about the hit point and characteristics of a material at the hit point. In addition, the ray tracing apparatus 100 may determine a color value of a pixel, taking into consideration a basic color of the material at the hit point, effects caused by a light source, or the like. For example, in the case of the pixel A of FIG. 1, the ray tracing apparatus 100 may determine a color value of the pixel A, taking into consideration all effects caused by the primary ray 40 and the secondary rays, i.e., the refraction ray 70, the reflection ray 60, and the shadow ray 50.

When operation S240 is completed, the ray tracing apparatus 100 may proceed to operation S210. After the shading of one pixel, the ray tracing apparatus 100 may perform operations S210 to S240 again so as to perform shading of other pixels, each in turn, or in parallel. The ray tracing apparatus 100 may iteratively perform operations S210 to S240 on the entire pixels constituting the screen.

The ray tracing apparatus 100 may receive data necessary for ray tracing from the external memory 270. The external memory 270 may store the AS 271 or the geometry data 272, or both. The AS 271 may be generated by the AS generator 250, and the generated AS 271 may be stored in the external memory 270. The geometry data 272 may represent information about primitives. The primitive may be a polygon, such as a triangle or a rectangle. The geometry data may represent information about apexes and locations of primitives included in an object. For example, when the primitives are triangles, the geometry data may include coordinates, normal vector, or texture coordinates of the apexes of the triangles.

FIG. 4 is a block diagram of a ray tracing system according to one or more embodiments.

Referring to FIG. 4, the ray tracing system may include a ray tracing apparatus 100, an AS generator 250, and an external memory 270 for example.

As described above with reference to FIG. 2, the AS generator 250 may generate an AS including location information of objects in a 3D space by applying, for example, a KD-tree, BVH, or other suitable structure as would be known to one of skill in the art after gaining a thorough understanding of the following disclosure. Therefore, as described above with reference to FIG. 3, the AS may be a hierarchical tree structure including e.g. a parent node and child nodes such as left child nodes and right child nodes.

According to one or more embodiments, a three-dimensional space corresponding to each node included in an AS may be aligned with a coordinate axis and expressed in a box form. This is referred to as an axis aligned bounding box (AABB). The AABB may be expressed by a minimum value (min) and a maximum value (max) for each of an x-axis, a y-axis, and a z-axis. For example, an AABB corresponding to one node may be expressed by a minimum value (BB.xmin) for the x-axis, a maximum value (BB.xmax) for the x-axis, a minimum value (BB.ymin) for the y-axis, a maximum value (BB.ymax) for the y-axis, a minimum value (BB.zmin) for the z-axis, and a maximum value (BB.zmax) for the z-axis. The space corresponding to each node may be also expressed by an oriented bounding box (OBB) which is a bounding box having orientation or other suitable addressing scheme. Hereinafter, for convenience of explanation, it is assumed that the space corresponding to each node is expressed by AABB.

The AS generator 250 may store, in the external memory 270, coordinate values (AS data) expressing AABBs respectively corresponding to nodes included in the AS.

Referring back to FIG. 4, the ray tracing apparatus 100 according to one or more embodiments may include a ray generation core 410, a traversal (TRV) core 420, an intersection (IST) determiner 430, and a shader 440.

As described above with reference to operation S210 of FIG. 2, the ray generation core 410 may generate a primary ray and rays derived from the primary ray.

The TRV core 420 may perform a ray-node intersection test by using the AS data. The TRV core 420 may include one or more levels of individual or shared cache memory, and the TRV core 420 may read a part of the AS data stored in the external memory 270 and store the read AS data in a cache memory, as an example.

The TRV core 420, of one or more embodiments, may perform the ray-node intersection test by using, for example, an algorithm of Table 1 below. Since the algorithm of Table 1, which performs the ray-node intersection test, is an example algorithm (e.g., a slab method) known to those of ordinary skill in the art, detailed descriptions thereof will be omitted.

TABLE 1

Xmin = (BB.xmin − Ray.orgx)*Ray.dirx
Xmax = (BB.xmax − Ray.orgx)*Ray.dirx
Ymin = (BB.ymin − Ray.orgy)*Ray.diry
Ymax = (BB.ymax − Ray.orgy)*Ray.diry
Zmin = (BB.zmin − Ray.orgz)*Ray.dirz
Zmax = (BB.zmax − Ray.orgz)*Ray.dirz
Max of min (_min) = max (max(min(Xmin, Xmax), min(Ymin, Ymax)), min(Zmin, Zmax))
Min of max (_max) = min (min(max(Xmin, Xmax), max(Ymin, Ymax)), max(Zmin, Zmax))
Intersection ? (_min <= _max) && (_max >= Ray.tmin) && (_min <= hitt)

Referring to Table 1, the TRV core 420 may check whether the ray intersects with the node, based on the coordinate values BB.xmin, BB.xmax, BB.ymin, BB.ymax, BB.zmin, and BB.zmax of the node. From the ray-node intersection test result, the TRV core 420 may detect a first node and a second node which intersect with the ray and have the same parent node.

Hereinafter, in a case where such a first node and a second node are detected, a process of AS traversal and hit point check will be described with reference to FIGS. 5 to 8.

FIGS. 5 to 8 are diagrams illustrating a location relationship among a first bounding box corresponding to a first node, a second bounding box corresponding to a second node, and a ray when the first node and the second node are detected, according to one or more embodiments.

The TRV core 420 may determine a nearest node among the first node and the second node. For example, it is assumed that the first bounding box corresponding to the first node and the ray intersect at a first point, and the second bounding box corresponding to the second node and the ray intersect at a second point. In this case, when the first point is nearer to the view point of the ray than the second point, the TRV core 420 may determine the first node as the near node.

Referring to FIGS. 5 to 8, the first bounding box 520 corresponds to a left child node (first node) of a parent node, the second bounding box 530 corresponds to a right child node (second node) of the parent node, and a third bounding box 510 corresponds to the parent node. In this case, the TRV core 420 may determine the first node as the near node, wherein the first node corresponds to the first bounding box 520 which intersects with the ray earlier in the traversal than the second bounding box 530. For example, when the first point P1 where the ray intersects with the first bounding box 520 is nearer to the view point of the ray than the second point P2 where the ray intersects with the second bounding box 530, the TRV core 420 may determine the first node to be the near node.

When the first node is determined as the near node, the TRV core 420 may store information about the other node, i.e., the second node, in a stack or other suitable memory structure, and perform traversal and hit point check on the second node after the traversal and hit point check on the first node is completed.

When the first node is a leaf node, the TRV core 420 may transmit the first node to the IST determiner 430. The IST determiner 430 may read information (geometry data) about primitives belonging to the first node from the external memory 270. The IST determiner 430 may perform an intersection test between the ray and the primitives based on the read information about the primitives. The IST determiner 430 may detect a primitive intersecting with the ray and calculate a point (hereinafter, referred to as a first hit point) where the detected primitive intersects with the ray. When a plurality of primitives intersect with the ray, the first hit point may be a hit point closest to the view point of the ray among a plurality of hit points.

For example, as illustrated in FIGS. 5 to 8, the IST determiner 430 may calculate a first hit point H1 where a first primitive 525, belonging to the first node, intersects with the ray.

When a primitive intersecting with the ray is not present among the primitives belonging to the first node, the IST determiner 430 may perform a hit point check on the second node.

When the first hit point is calculated, the TRV core 420 may determine whether the first bounding box corresponding to the first node overlaps the second bounding box corresponding to the second node.

Figure 5:
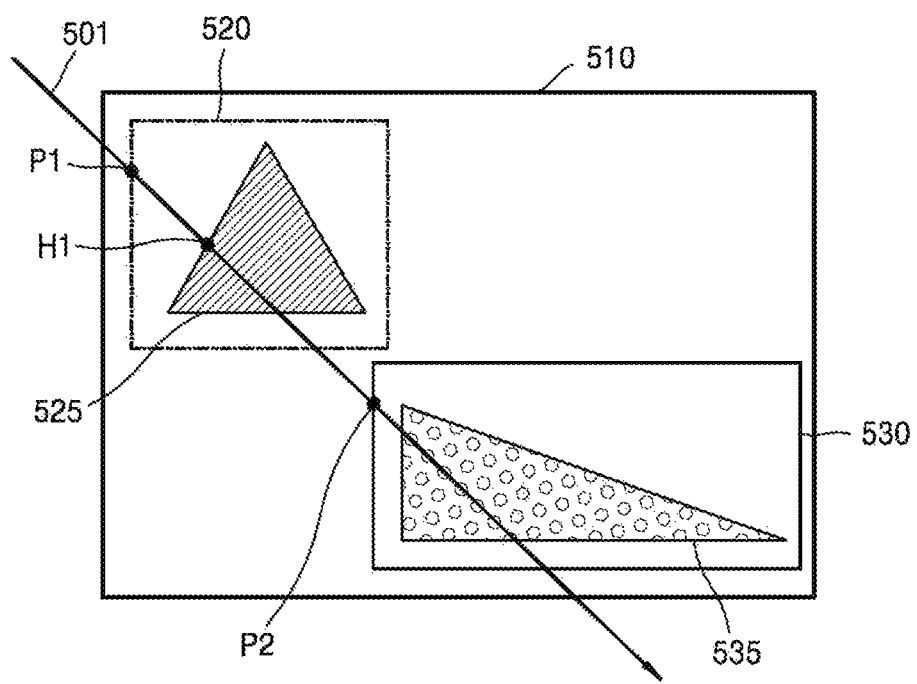
FIGS. 5 to 8 are diagrams illustrating a location relationship among a first bounding box corresponding to a first node, a second bounding box corresponding to a second node, and a ray when the first node and the second node are detected, according to one or more embodiments.

When the first bounding box does not overlap the second bounding box, the IST determiner 430 may determine the first hit point as a final hit point, without performing the hit point check on the second node. For example, as illustrated in FIG. 5, when the first bounding box 520 does not overlap the second bounding box 530, the IST determiner 430 may determine the first hit point H1 as a final hit point, without performing the hit point check on the second node.

On the other hand, when the first bounding box overlaps the second bounding box, (such as with FIG. 6, bounding box 520 is seen to overlap second bounding box 530), the TRV core 420 may acquire coordinate values representing a region (overlap bounding box) where the first bounding box overlaps the second bounding box. For example, referring to Table 2 below, the TRV core 420 may calculate coordinate values BB.O.xmin, BB.O.xmax, BB.O.ymin, BB.O.ymax, BB.O.zmin, and BB.O.zmax representing the overlap bounding box, based on coordinate values BB.R.xmin, BB.R.xmax, BB.R.ymin, BB.R.ymax, BB.R.zmin, and BB.R.zmax representing the first bounding box and coordinate values BB.L.xmin, BB.L.xmax, BB.L.ymin, BB.L.ymax, BB.L.zmin, and BB.L.zmax representing the second bounding box.

TABLE 2

BB.O.xmin = max(BB.R.xmin, BB.L.xmin)
BB.O.xmax = min(BB.R.xmax, BB.L.xmax)
BB.O.ymin = max(BB.R.ymin, BB.L.ymin)
BB.O.ymax = min(BB.R.ymax, BB.L.ymax)
BB.O.zmin = max(BB.R.zmin, BB.L.zmin)
BB.O.zmax = min(BB.R.zmax, BB.L.zmax)

When the coordinate values BB.O.xmin, BB.O.xmax, BB.O.ymin, BB.O.ymax, BB.O.zmin, and BB.O.zmax representing the overlap bounding box are acquired (such as demonstrated in overlapping bounding box 450 of FIG. 6), the TRV core 420 may use the algorithm of Table 1 to check whether the overlap bounding box intersects with the ray.

Figure 6:
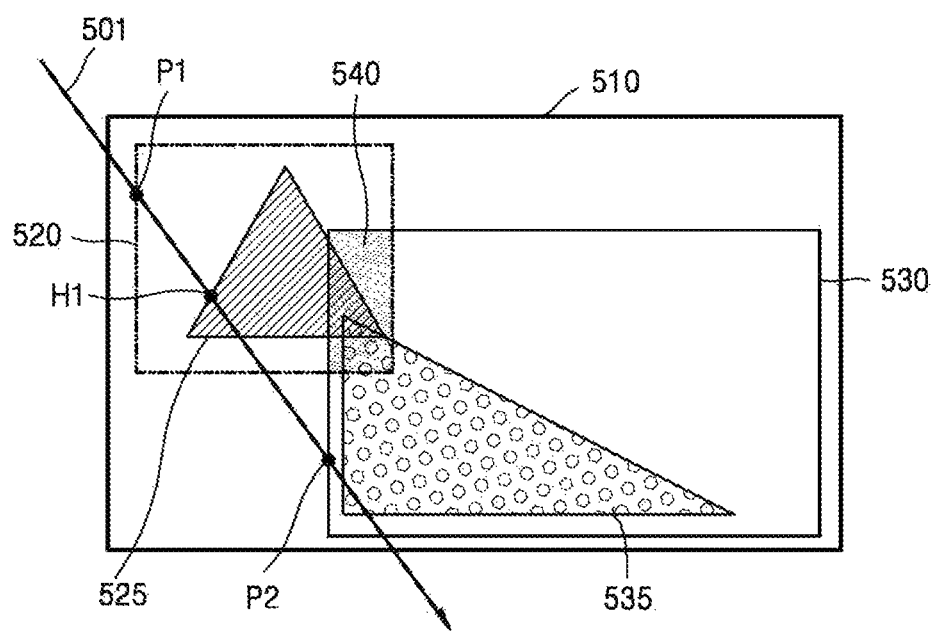

When the overlap bounding box does not intersect with the ray, the IST determiner 430 may determine the first hit point as a final hit point, without performing the hit point check on the second node. For example, as illustrated in FIG. 6, when the overlap bounding box 540 does not intercept the ray, the IST determiner 430 may determine the first hit point H1 as a final hit point, without performing the hit point check on the second node.

Figure 7:
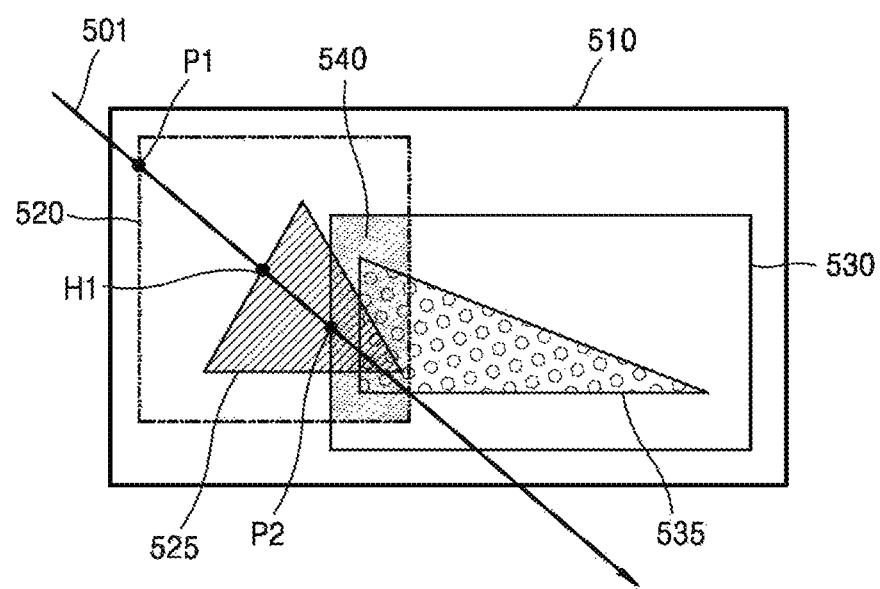

On the other hand, when the overlap bounding box intersects with the ray, the TRV core 420 may determine whether a point (second hit point) where the overlap bounding box intersects with the ray is nearer to the view point of the ray than the first hit point. When it is determined that the second hit point is farther from the view point of the ray than the first hit point, the IST determiner 430 may determine the first hit point as a final hit point, without performing the hit point check on the second node. For example, as illustrated in FIG. 7, when the second hit point P2 is farther from the view point of the ray than the first hit point H1, the IST determiner 430 may determine the first hit point H1 as a final hit point, without performing the hit point check on the second node.

Figure 8:
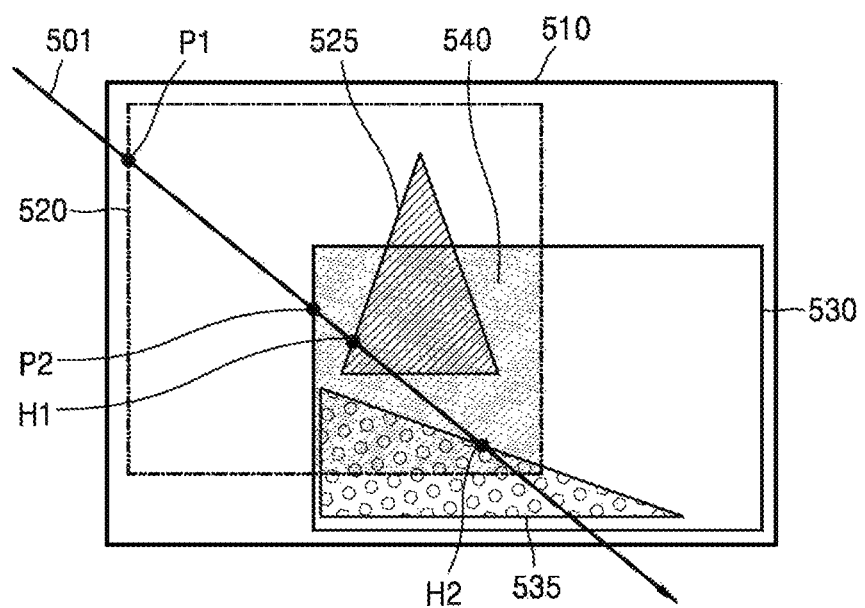

In contrast, when the second hit point is nearer to the view point of the ray than the first hit point, the IST determiner 430 may perform the hit point check on the second node. For example, as illustrated in FIG. 8, when the second hit point P2 is nearer to the view point of the ray than the first hit point H1, the IST determiner 430 may perform the hit point check on the second node to calculate a point (third hit point H2) where a second primitive belonging to the second node intersects with the ray. The IST determiner 430 may determine whichever one of the first hit point H1 and the third hit point H2 is nearer to the view point of the ray as a final hit point.

The shader 440 may receive the final hit point from the IST determiner 430. The shader 440 may determine a color value of a pixel based on information about the final hit point and characteristics of a material at the final hit point. In addition, the shader 440 may determine a color value of a pixel, taking into consideration a basic color of the material at the final hit point, effects caused by a light source, or the like. For example, in the case of the pixel A of FIG. 1, the shader 440 may determine a color value of the pixel A, taking into consideration substantially all effects caused by the primary ray 40 and the secondary rays, i.e., the refraction ray 70, the reflection ray 60, and the shadow ray 50.

Figure 9:
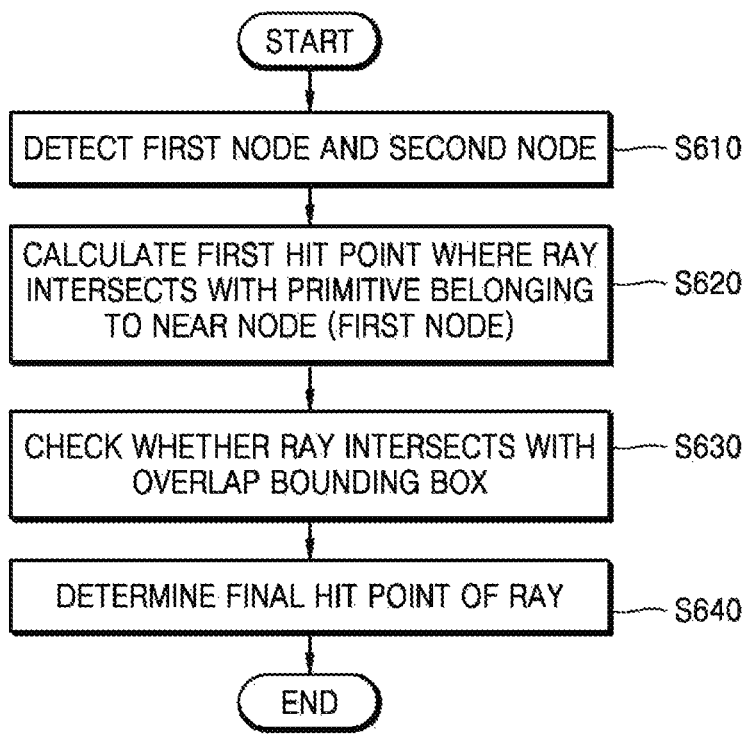
FIG. 9 is a flowchart of a ray tracing method according to one or more embodiments.

FIG. 9 is a flowchart of a ray tracing method according to one or more embodiments.

Referring to FIG. 9, in operation S610, the ray tracing apparatus 100 may detect a first node and a second node, which intersect with the ray and have the same parent node, by traversing an AS.

For example, the ray tracing apparatus 100 may generate a ray and traverse the AS by using the generated ray. The ray tracing apparatus 100 may perform a ray-node intersection test on nodes included in the AS by using the AS data and the algorithm of Table 1. When both the first node and the second node having the same parent node intersect with the ray, the ray tracing apparatus 100 may determine a nearest node among the first node and the second node.

In operation S620, when the first node is determined as the near node, the ray tracing apparatus 100 may store information about the other node, i.e., the second node, in a stack, and calculate a first hit point where a primitive belonging to the first node intersects with the ray.

When the first hit point is calculated, the ray tracing apparatus 100 may determine whether a first bounding box corresponding to the first node overlaps a second bounding box corresponding to the second node.

When the first bounding box corresponding to the first node does not overlap the second bounding box corresponding to the second node, the ray tracing apparatus 100 may determine the first hit point as a final hit point, without performing the hit point check on the second node.

In operation S630, when the first bounding box corresponding to the first node overlaps the second bounding box corresponding to the second node, the ray tracing apparatus 100 may check whether the ray intersects with a region (overlap bounding box) where the first bounding box corresponding to the first node overlaps the second bounding box corresponding to the second node.

For example, when the first bounding box overlaps the second bounding box, the ray tracing apparatus 100 may acquire coordinate values representing the overlap bounding box, based on coordinate values representing the first bounding box and coordinate values representing the second bounding box. When the coordinate values representing the overlap bounding box are acquired, the ray tracing apparatus 100 may use the algorithm of Table 1 to check whether the overlap bounding box intersects with the ray.

In operation S640, the ray tracing apparatus 100 may determine the final hit point of the ray based on a result of the checking. Operation S640 will be described in further detail with reference to FIG. 10.

Figure 10:
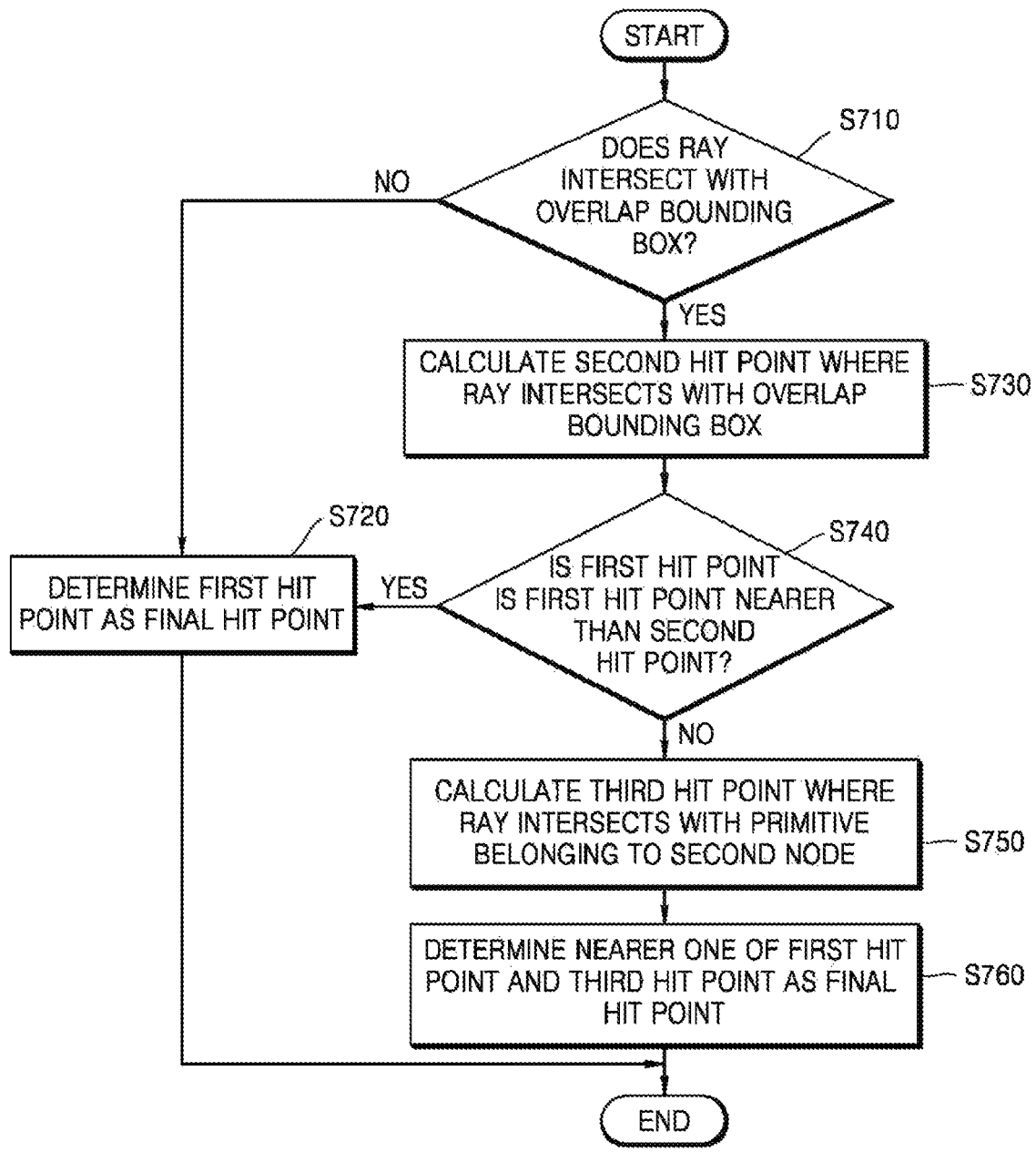
FIG. 10 is a flowchart of an operation of determining a final hit point according to one or more embodiments.

FIG. 10 is a flowchart of a final hitpoint determination operation, such as for operation S640 of FIG. 9, according to one or more embodiments.

Referring to FIG. 10, in operation S710, the ray tracing apparatus 100 may determine whether the ray intersects with the overlap bounding box. In operation S720, when it is determined in operation S710 that the ray does not intersect with the overlap bounding box, the ray tracing apparatus 100 may determine the first hit point, which is calculated in operation S620 of FIG. 9 for example, to be the final hit point.

In operation S740, when it is determined in operation S710 that the ray intersects with the overlap bounding box, the ray tracing apparatus 100 may calculate a point (second hit point) where the ray intersects with the overlap bounding box) and determine whether the first hit point is nearer to the view point of the ray than the second hit point. When the first hit point is nearer to the view point of the ray than the second hit point, the ray tracing apparatus 100 may determine the first hit point to be the final hit point.

In contrast, in operation S750, when the first hit point is farther from the view point of the ray than the second hit point, the ray tracing apparatus 100 may calculate a point (third hit point) where the ray intersects with a primitive belonging to the second node.

In operation S760, the ray tracing apparatus 100 may determine whichever one of the first hit point and the third hit point is nearer to the view point of the ray to be the final hit point.

The ray tracing apparatus 100 may determine a color value of a pixel based on information about the determined final hit point and characteristics of a material at the determined final hit point. In addition, the ray tracing apparatus 100 may determine a color value of a pixel, taking into consideration a basic color of the material at the determined final hit point, effects caused by a light source, or the like.

The ray tracing methods according to one or more embodiments may be embodied as computer-readable codes on a non-transitory computer-readable recording medium. The non-transitory computer-readable recording medium may be any recording medium that can store data which can be thereafter be read by a computer system. Examples of the non-transitory computer-readable recording medium may include read-only memory (ROM), random-access memory (RAM), CD-ROMs, magnetic tapes, floppy disks, and optical data storage devices. The non-transitory computer-readable recording medium may also be distributed over one or more network-coupled computer systems so that the computer-readable code is stored and executed in a distributed fashion.

The apparatuses, units, modules, devices, and other components illustrated in FIGS. 2-4 that perform the operations described herein with respect to FIGS. 1-10 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-10. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described herein are performed by computing hardware, for example, by one or more processors or computers, as described above executing instructions or software to perform the operations described herein.

A computing system or a computer may include a microprocessor that is electrically connected to a bus, a user interface, and a memory controller, and may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent to one of ordinary skill in the art that the computing system or computer may further include an application chipset, a camera image processor, a mobile Dynamic Random Access Memory (DRAM), or any other device known to one of ordinary skill in the art as being suitable for inclusion in a computing system or computer. The memory controller and the flash memory device may constitute a solid-state drive or disk (SSD) that uses non-volatile memory to store data.

Instructions or software to control such a processor or computer, for example, to implement the hardware components and perform the methods as described above are written as processor or computer readable programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art, after gaining a full understanding of the following description, can readily write the instructions or software based on the block diagrams and the flow charts illustrated in the drawings and the corresponding descriptions in the specification, which disclose algorithms for performing the operations performed by the hardware components and the methods as described above.

The instructions or software to control a processing device, processor, or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art, after gaining a thorough understanding of the instant disclosure, that various changes in form and details may be made herein without departing from the spirit and scope as defined by the following claims.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A ray tracing apparatus comprising:
   one or more processors including:
   a traversal (TRV) core including at least one cache memory, the TRV core is configured to traverse an acceleration structure (AS) to detect a first node and a second node, which intersect with a generated ray and have a determined same parent node, and to determine whether the ray intersects with an overlap region where a first bounding box corresponding to the first node overlaps a second bounding box corresponding to the second node, and wherein the TRV core is configured to retrieve AS data from an external memory; and,
   an intersection test (IST) determiner configured to calculate a first hit point where the ray intersects with a primitive belonging to the first node, which is a closer node to a view point of the ray among the first node and the second node, and to determine a final hit point of the ray based on a result of the determining of whether the ray intersects with respect to an overlap region, by the TRV core,
   wherein the IST determiner is further configured to determine the calculated first hit point to be the final hit point of the ray and responsively omit further traversal with respect to the second node in response to the determining of whether the ray intersects with an overlap region.

2. The ray tracing apparatus of claim 1, wherein a point where the ray intersects with the first bounding box is nearer to a view point of the ray than a point where the ray intersects with the second bounding box.

3. The ray tracing apparatus of claim 1, wherein the TRV core is further configured to calculate a second hit point where the ray intersects with the overlap region in response to the ray being determined to intersect with the overlap region, and
   the IST determiner is further configured to determine the first hit point as the final hit point when the second hit point is determined to be farther from a view point of the ray than the first hit point.

4. The ray tracing apparatus of claim 3, wherein the IST determiner is further configured to check for a third hit point between a primitive belonging to the second node and the ray when the second hit point is nearer to the view point of the ray than the first hit point.

5. The ray tracing apparatus of claim 4, wherein the IST determiner is further configured to determine whichever one of the first hit point and the third hit point is nearer to the view point of the ray to be the final hit point.

6. The ray tracing apparatus of claim 1, wherein the first node and the second node are leaf nodes of the acceleration structure.

7. The ray tracing apparatus of claim 1, wherein the TRV core is further configured to check whether the ray intersects with the overlap region based on acquired coordinate values representing the overlap region, and
the coordinate values representing the overlap region are acquired based on determined coordinate values representing the first bounding box and determined coordinate values representing the second bounding box.

8. The ray tracing apparatus of claim 1, further comprising a shader configured to determine a color value of a pixel based on the determined final hit point.

9. The ray tracing apparatus of claim 1, further comprising a ray generator configured to generate the ray.

10. A ray tracing method comprising:
actuating a traversal (TRV) core of one or more processors including at least one cache memory to retrieve an acceleration structure (AS) data from an external memory, and to traverse an acceleration structure (AS) to detect a first node and a second node that intersect with a ray and have a same parent node;
calculating, by an intersection test (IST) determiner of the one or more processors, a first hit point where the ray intersects with a primitive belonging to the first node, which is a nearer node to a view point of the ray among the first node and the second node;
determining, by the IST determiner, whether the ray intersects with an overlap region where a first bounding box corresponding to the first node overlaps a second bounding box corresponding to the second node; and
determining, by the IST determiner, a final hit point of the ray based on a result of the determining of whether the ray intersects with the overlap region,
wherein the determining, by the IST determine, of the final hit point of the ray comprises determining the calculated first hit point as the final hit point of the ray, and responsively omit traversal along the second node when the ray is determined to not intersect with the overlap region.

11. The ray tracing method of claim 10, wherein a point where the ray intersects with the first bounding box is nearer to the view point of the ray than a point where the ray intersects with the second bounding box.

12. The ray tracing method of claim 10, wherein the determining of the final hit point of the ray comprises:
calculating a second hit point where the ray intersects with the overlap region when the ray is determined to intersect with the overlap region; and
determining the first hit point as the final hit point when the second hit point is determined to be further from the view point of the ray than the first hit point.

13. The ray tracing method of claim 12, wherein the determining of the final hit point of the ray further comprises, identifying a hit point between the ray and a primitive belonging to the second node when the second hit point is determined to be nearer to the view point of the ray than the first hit point.

14. The ray tracing method of claim 13, wherein the determining of the final hit point of the ray further comprises determining whichever one of the first hit point and a third hit point is nearer to the view point of the ray to be the final hit point, the third hit point being a point where the ray intersects with the primitive belonging to the second node.

15. The ray tracing method of claim 10, wherein the first node and the second node are leaf nodes.

16. The ray tracing method of claim 10, wherein the determining of whether the ray intersects with the overlap region comprises:
acquiring coordinate values representing the overlap region based on coordinate values representing the first bounding box and coordinate values representing the second bounding box; and,
determining whether the ray intersects with the overlap region, based on the coordinate values representing the overlap region.

17. The ray tracing method of claim 10, further comprising determining a color value of a pixel based on the determined final hit point.

18. A non-transitory computer-readable recording medium having recorded thereon a program causing a computer to execute a ray tracing method that comprises:
actuating a traversal (TRV) core to traverse an acceleration structure (AS) to detect a first node and a second node that intersect with a ray and have a same parent node;
calculating first hit point where the ray intersects with a primitive belonging to the first node, which is a nearer node to a view point of the ray among the first node and the second node;
determining whether the ray intersects with an overlap region where a first bounding box corresponding to the first node overlaps a second bounding box corresponding to the second node; and
determining a final hit point of the ray based on a result of the determining of whether the ray intersects with the overlap region,
wherein the determining of the final hit point of the ray comprises, determining the calculated first hit point as the final hit point of the ray, and responsively omit traversal along the second node when the ray is determined to not intersect with the overlap region.

* * * * *